May 17, 1960 C. R. SKARIN 2,936,722
SEALING DOOR FOR BAKING OVEN
Filed April 30, 1956 6 Sheets-Sheet 1

Inventor:
Carl Richard Skarin
By Bair, Freeman & Molinare
Attys.

May 17, 1960 C. R. SKARIN 2,936,722
SEALING DOOR FOR BAKING OVEN
Filed April 30, 1956 6 Sheets-Sheet 4

Inventor:
Carl Richard Skarin
By Bair, Freeman & Molinare
Attys.

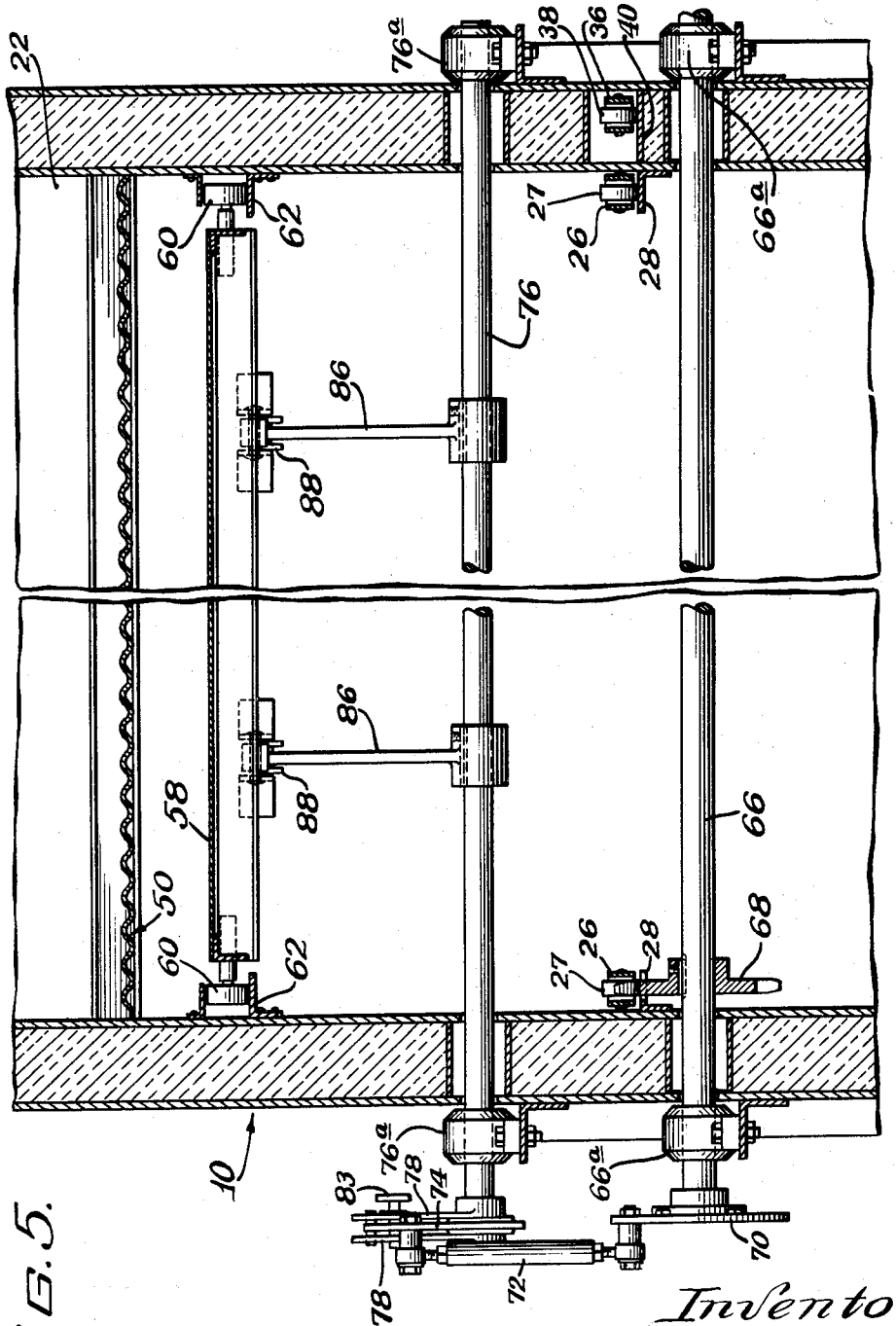

May 17, 1960  C. R. SKARIN  2,936,722
SEALING DOOR FOR BAKING OVEN
Filed April 30, 1956  6 Sheets-Sheet 6
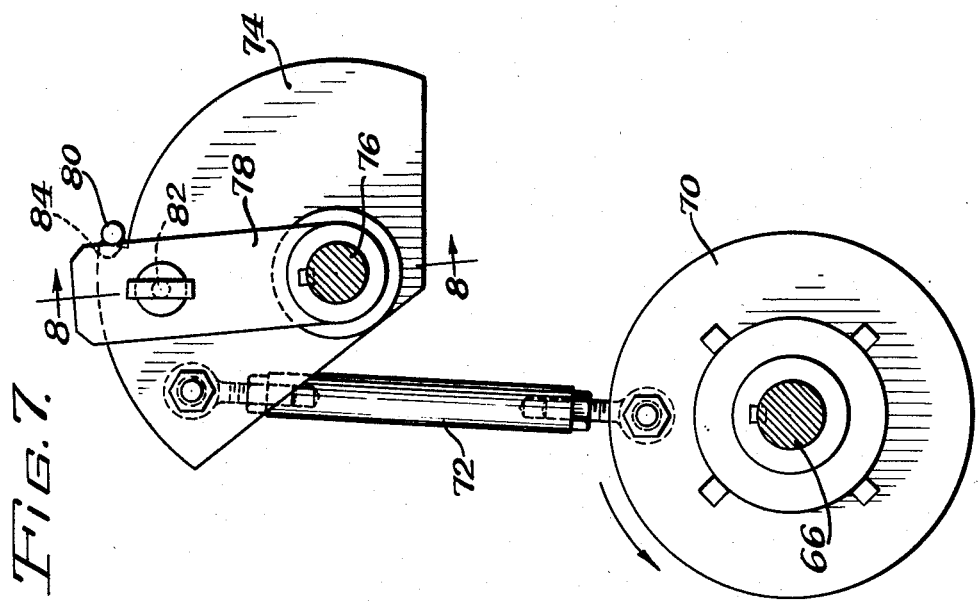
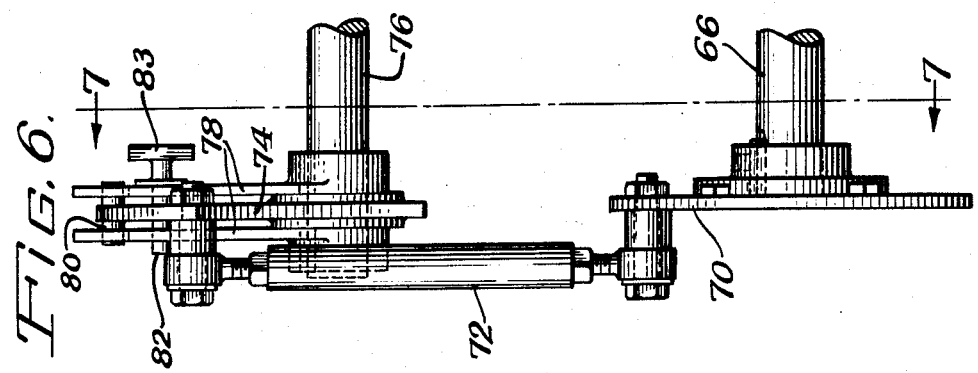
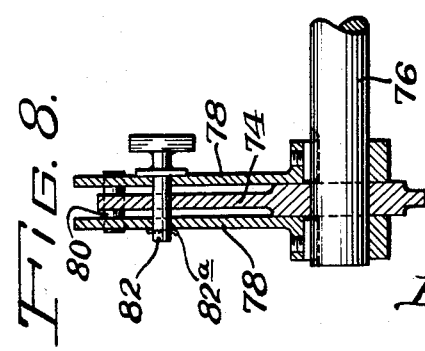
Inventor:
Carl Richard Skarin

United States Patent Office 2,936,722
Patented May 17, 1960

2,936,722

SEALING DOOR FOR BAKING OVEN

Carl Richard Skarin, Western Springs, Ill., assignor, by mesne assignments, to Baker Perkins, Inc., Saginaw, Mich., a corporation of New York Application April 30, 1956, Serial No. 581,546

11 Claims. (Cl. 107—57)

This invention relates to commercial baking ovens of the type having a baking chamber provided with conveyor means therein for moving the goods through the baking chamber to perform a baking operation upon the goods. More particularly, the present invention is directed to baking ovens having conveyor means of the type providing two or more runs or laps, spaced apart vertically and extending generally horizontally in the baking chamber, and the conveyor being provided with a multiplicity of spaced apart trays adapted to be successively moved past a loading zone at the front end of the oven.

Such ovens are usually provided with a door for controlling the loading opening. Said door must by necessity remain in open position during the time that the goods to be baked are being introduced into the oven. Because of this condition, a substantial volume of cold air is permitted to enter into the baking chamber, which causes substantial heat loss and variation in steam or moisture conditions within the baking chamber, which renders it difficult to maintain the desired control of operation of the baking chamber to obtain the desired characteristics in the goods being baked.

One of the objects of this invention is to provide a novel constructional arrangement for reducing heat and/or steam loss in certain zones of the baking chamber incident to the door at the loading opening being disposed in open position.

Another object is to provide an improved oven of the character indicated, having partition means therein for dividing the baking chamber into an upper and a lower compartment, and providing a controlled opening in the partition means through which the conveyor and its trays pass from one of the chambers into the other.

A further object of this invention is to provide partition means in the baking chamber of an oven so as to provide an upper and lower compartment, together with an opening in the partition means through which the conveyor and its trays pass from one compartment into the other, together with a door operating in timed relation to the movement of the conveyor for controlling the partition opening and causing closing of the door immediately after a tray has passed through the opening in the partitioning means.

And still another object is to provide a novel oven construction having partition means in the baking chamber to provide upper and lower compartments, with an opening in the partition means through which the conveyor trays are permitted to pass from one compartment into another, together with a door for controlling said opening, operated in timed relation to movement of the conveyor for causing closing of the door when a tray of the conveyor registers with the loading opening.

A still further object is to provide an improved oven construction of the character above indicated having a fail-safe feature, by virtue of which the door for controlling the opening in the partition means is positively moved to, and permitted to remain at, open position when certain excessive loads or strains are imposed on the conveyor.

Other objects and advantages of this invention will be apparent from the following description taken in connection with the accompanying drawings, in which:

Figure 5 is a vertical sectional view, taken substantially as indicated at line 5—5 on Figure 3.

Figure 6 is an enlarged front elevational view of the operating mechanism, located outside of the oven wall, as seen in Figure 5 of the drawings, for controlling the partition door.

Figure 7 is a view, in elevation, of the operating mechanism, taken substantially as indicated at line 7—7 on Figure 6.

Figure 8 is a sectional view, taken as indicated at line 8—8 on Figure 7.

Figure 1:
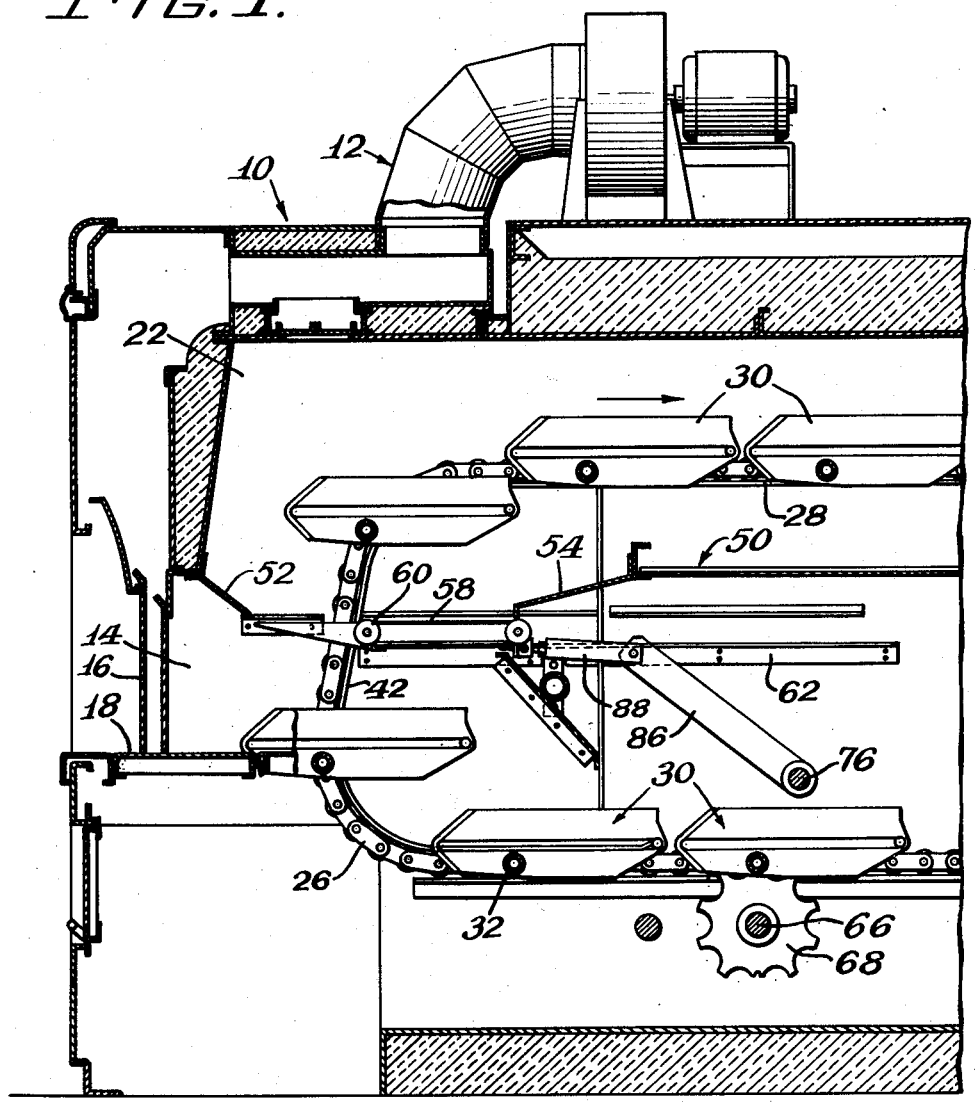
Figure 1 is a vertical, longitudinal section through the forward portion of a baking oven embodying the present invention.

It is to be understood that the present invention is adapted for embodiment in baking ovens wherein the conveyor and its trays move either continuously or intermittently for successively moving the trays of the conveyor past a loading opening. Where the conveyor is of the continuously traveling type, suitable mechanical apparatus, well known in the art, is usually employed for moving the goods through the loading opening onto the trays of the conveyor. Where the conveyor is of the intermittently operated type, wherein the trays thereof successively register and are caused to be arrested in alignment with the shelf of a loading opening, the goods are loaded onto the trays either manually or by suitable mechanical apparatus, as is well known in the art.

Referring now to the drawings, the baking oven is indicated generally at 10, having suitable vent means indicated generally at 12, a loading opening 14, and a vertically movable door 16 for controlling said opening. The lower edge of the loading opening is defined by a shelf indicated at 18, over which the goods are adapted to be moved in the process of being transferred onto the trays of the conveyor.

The oven includes a baking chamber indicated at 22, in which is mounted a conveyor. It is to be understood that the conveyor is constructed and arranged to move through a closed, continuous path, only a portion of which is shown in the drawings. The conveyor includes a pair of transversely spaced apart endless chains 26, which include rollers 27, at the pivots of the respective links of chain, with the rollers being positioned for moving over track means indicated generally at 28, secured to the side walls of the oven. Mounted on the conveyor chains are a plurality of relatively uniformly spaced apart trays indicated generally at 30, including a transversely extending tie member 32, pivotally connected to the respective strands of chains 26. Connected to one end of each tie member is a crank arm 34, as clearly seen in Figure 4 of the drawings. The opposite end of the crank is pivotally connected to an auxiliary strand of conveyor chain indicated at 36, having rollers 38, at the pivot connection of the links thereof, and said auxiliary strand of chain is also endless, and is adapted to move over track means indicated at 40, spaced horizontally and outwardly from one of the main strands of chain 26. The purpose of the auxiliary strand of chain, together with its respective crank arms 34, is to maintain the trays 30 normally in horizontal position during their path of travel within the baking chamber. It may be understood that the three strands of chain 26 and 36 are driven by sprocket wheels, or the like (which are not shown, and which would be located adjacent the rear end of the baking chamber). These three strands of chain, at the forward end of the baking chamber, travel around appropriately shaped tracks interconnecting the horizontal tracks for the upper and lower runs of the conveyor, as clearly seen in Figure 3 of the drawings. As may be seen in Figure 3 of the drawings, the chains 26 travel over end tracks as indicated at 42, while the auxiliary strand of chain 36 travels over a track indicated in dot and dash outline at 44.

It is to be noted that the conveyor is so arranged as to cause the trays 30 to move past the loading opening 14. When the conveyor is of the intermittently operated type, the supporting surfaces of the trays are caused to be temporarily arrested in alignment with the loading shelf 18, as clearly seen in Figure 1 of the drawings.

By virtue of the construction herein disclosed, the conveyor provides upper and lower runs within the baking chamber 22, and constitutes what is commonly referred to as a double lap oven wherein the goods to be baked are caused to travel first from the front portion of the oven to the rear portion of the oven, and then from the rear portion to the front portion of the oven, where the goods are then discharged from the trays of the conveyor.

It is to be understood that the goods may be removed from the trays of the conveyor manually when the trays register with the loading shelf 18, or the goods may be discharged automatically from the trays by suitable mechanism, well known in the art, as the trays approach the forward end portion of the baking chamber.

Referring now more specifically to the present invention, I provide a transversely extending partition means indicated generally at 50, extending to the side walls of the baking chamber 22, disposed between the upper and lower runs of the conveyor. As may be clearly seen in Figure 3 of the drawings, the partition means adjacent the forward end of the oven includes two, oppositely disposed, downwardly inclined portions 52 and 54, between the inner edges of which is defined an opening 56 in the partition means, through which the conveyor and the trays 30 are permitted to pass in moving from one run of the conveyor to the other. In the conveyor herein illustrated, it is to be understood that the path of travel thereof is in the direction indicated by the arrows, and at the forward end of the oven the conveyor is moving in an upward direction.

The opening 56 in the partitioning means is controlled by a movable door, indicated generally at 58, having a pair of rollers 60 at each of its opposite sides, mounted for movement in guide tracks 62 connected to the side walls of the oven. The door is movable longitudinally in a horizontal direction into and out of registration with the opening 56 of the partition means. As may be seen in Figures 1 and 2 of the drawings, the door 58 is in a closed position, while in Figure 3 of the drawings the door is shown in full open position.

Suitable operating means is provided for moving the door 58 into and out of closed position with respect to the opening 56 in timed relation to the movement of the trays 30 of the conveyor so that when each tray registers with the loading shelf 18, which coincides with a tray passing through the opening 56, the door is caused to move to a closed position, and is again retracted to open position immediately prior to arrival of the next tray at the loading shelf, and preparatory to passing of another tray through the opening 56.

Figure 2:
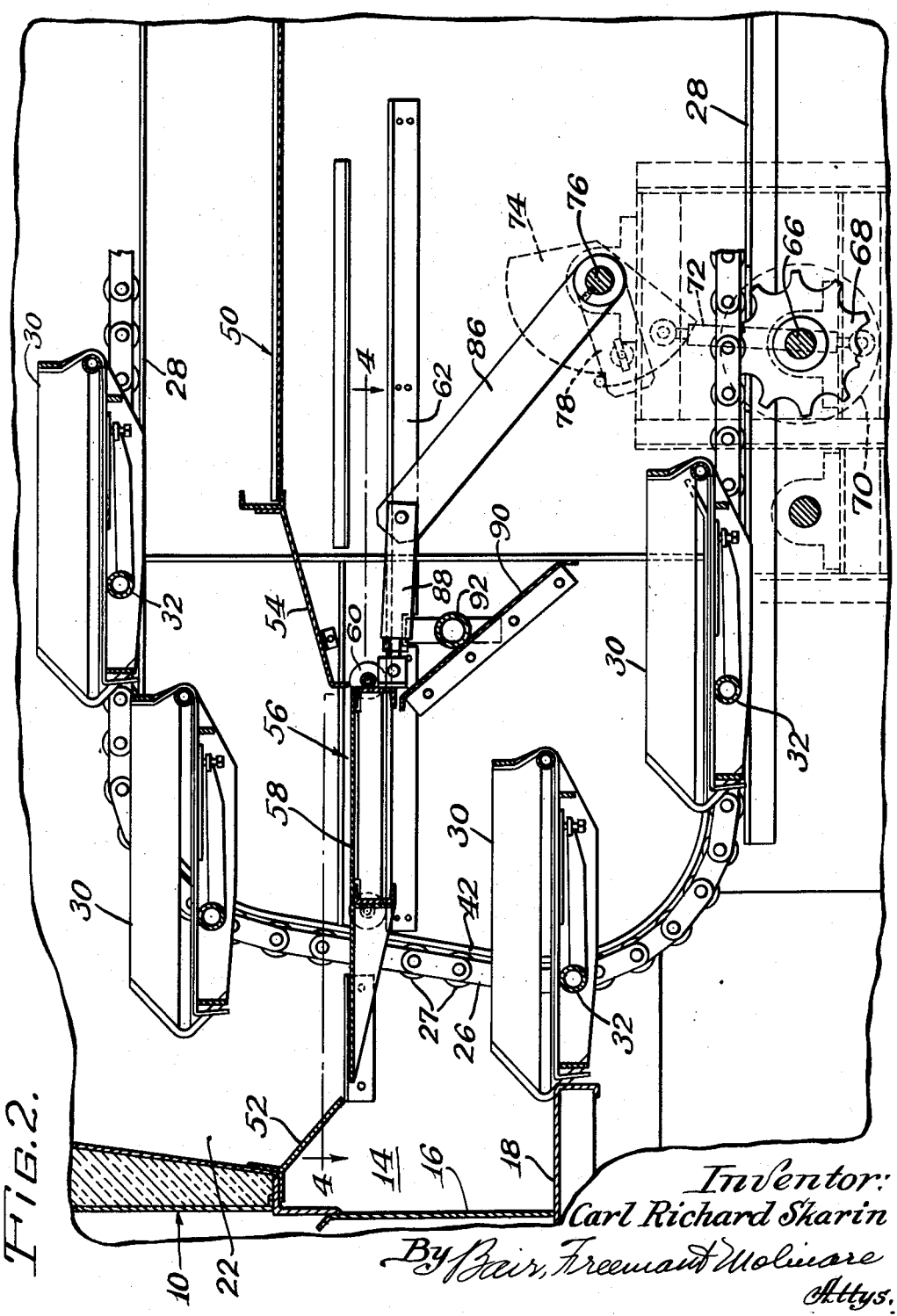
Figures 2 and 3 are enlarged, longitudinal sectional views of the forward portion of the oven, showing respectively the two main positions of the operating mechanism and door for controlling the opening in the partition means in the oven chamber.

The means for operating the door 58 will now be described. A transversely extending power take-off shaft, indicated at 66, positioned in the lower portion of the baking chamber, is provided with a sprocket wheel 68, fixedly secured thereto, and the sprocket wheel is positioned in mesh with one of the strands of the conveyor chain indicated at 26, as seen in Figures 2 and 5 of the drawings. The shaft 66 extends through the oven side walls, as seen in Figure 5 of the drawings, and rigidly attached to one outer end of the said shaft is a crank member 70, herein shown in the nature of a disc. Pivotally connected to the crank member 70, is a pitman 72, the opposite end of which is pivotally connected to a segment member 74, which in turn is loosely mounted on a transversely extending rock shaft 76, the ends of which also extend through the side walls of the oven. The shafts 66 and 76 are journalled adjacent their outer ends, in bearings indicated at 66a and 76a respectively, secured to the exterior of the oven walls. Fixedly secured, as by keying, on the rock shaft 76, are a pair of rocker arms 78, disposed in alignment, at opposite sides of the segment member 74, and rigidly connected together at their outer ends by a cross pin 80, welded to corresponding edges of said arms. The rocker arms are adapted to be interconnected with the segment member 74 through the medium of a shear pin 82, having a head 83, for convenience in insertion and removing the pin from operative position. The shear pin is held in place by a cotter pin 82a. Desirably, the segment member 74 is of sufficient arcuate extent as to provide a solid surface extension of at least 15 degrees beyond each side of and in arcuate alignment with the shear pin, so as to make certain that the shear pin can only be inserted in a manner to properly connect the rocker arms 78 and segment member 74, and preclude insertion in merely the rocker arms or segment member. The segment member is provided with a shoulder, indicated at 84, adapted under certain conditions, as hereafter described, to engage the cross pin 80 for moving the segment member in one direction.

Rigidly mounted, as by keying, on the rock shaft 76 are a pair of axially spaced apart arms 86, the free ends of which are pivotally connected to sets of links 88 which, in turn, are pivotally connected to the rear end of the door 58.

It is to be understood that the sprocket wheel 68 is of a proper size, and has a proper number of teeth, by virtue of which it makes a single revolution for each unit movement of the conveyor, as determined by the spacing of the trays 30 thereon. The mechanism above-described is initially so adjusted that the door 58 is caused to move to a closed position when a tray 30 registers with the loading shelf 18, which occurs immediately after a tray 30 passes through the opening 56 of the partition means 50. It will be apparent that through the medium of the sprocket wheel 68, the crank member 70 imparts a rocking motion to the segment 74, and through the medium of the shear pin 82, the movement of said member is transmitted through the rocker arms 78, to the rock shaft 76 and which, in turn, operates the linkage 86 and 88 for moving the door 58 reciprocably relatively to the opening 56.

In the event of excessive loads or strains imposed upon the conveyor, such as may be caused by jamming of trays, or jamming of trays with articles on the trays, the shear pin 82 will be ruptured and no further motion will be transmitted through the connection of the shear pin and the rocker arms for actuating the door 58. In the event of such a condition, the shoulder 84 of the segment member will engage the cross pin 80 connected to the rocker arms 78, and will cause the rocker arms to actuate the linkage 86 and 88 to move the door 58 to its full open position, where it will remain until the shear pin is replaced. It will be apparent that after such movement of the linkage, the return movement of the segment member 74 will not be transmitted to the rocker arms 78, and said arms linkage 86—88 will remain in the position they were moved to by the upstroke imparted to the segment member 74 through the pitman 72. Thus, in the event of excessive strains imposed on the conveyor chains, such as caused by jamming of trays or the like, the door 58 will be caused to fail safely, i.e. be moved to and remain in open position so as not in any way add to the complications of the jammed or overloaded condition of the conveyor.

Frequently, in ovens of the type here involved, when used for baking food stuffs, such as bread, steam is injected into the upper part of the oven and air is introduced into the oven chamber, carrying the steam toward the rear end thereof. In such ovens, it has been noted that when the door 16 at the loading opening is in open position, cold air enters the baking chamber, resulting in substantial heat loss, and also causing variation in the humidity and steam conditions within the baking chamber so as to make it extremely difficult to maintain accurate control of the temperature and humidity and steam conditions in various zones of the baking chamber. Such control of the baking chamber is necessary in order to provide baking conditions to obtain desired crust characteristics of the bread, such as sheen, smoothness, free of ruptures in outer surfaces, as well as color.

Figure 3:
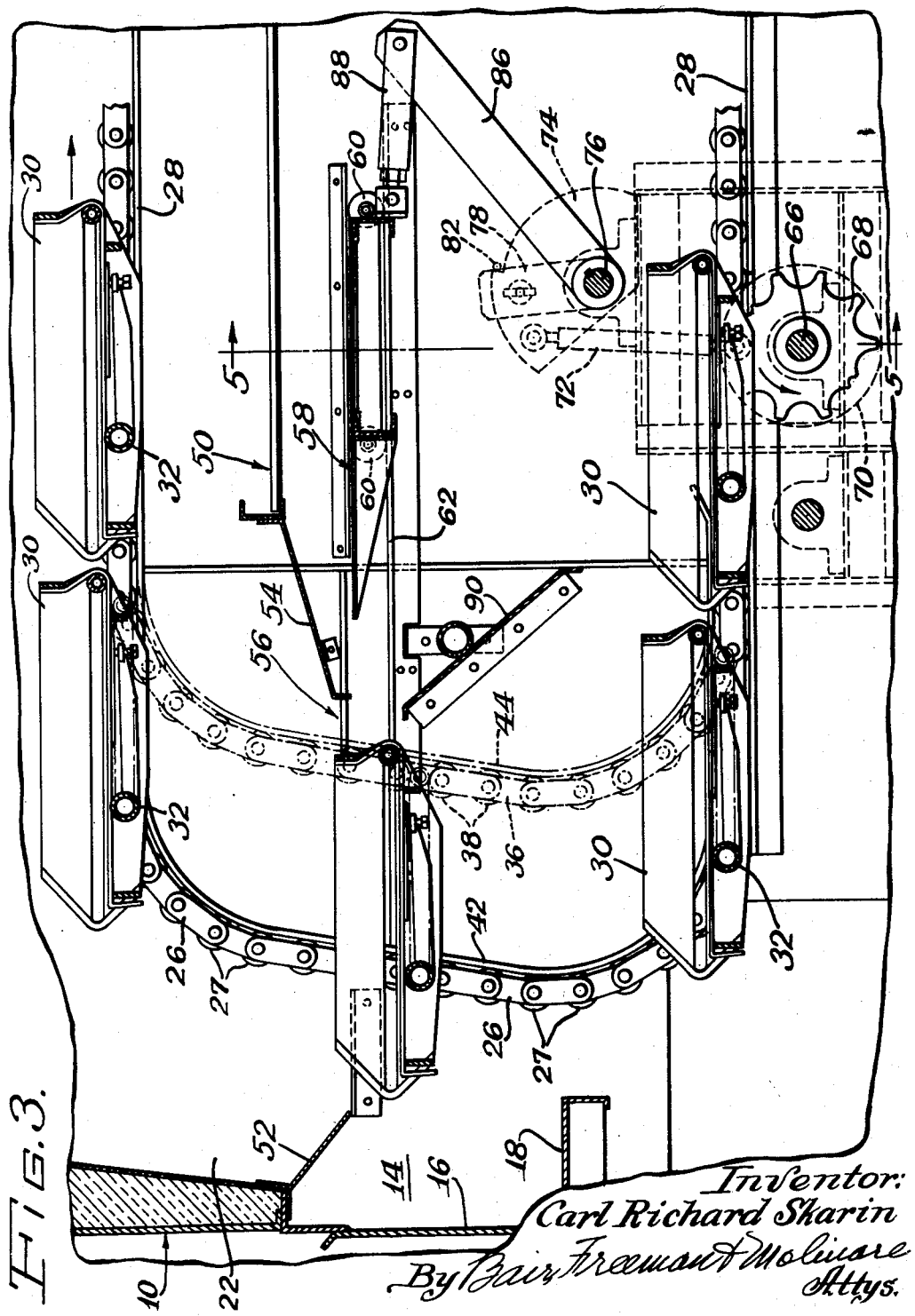
Figure 4:
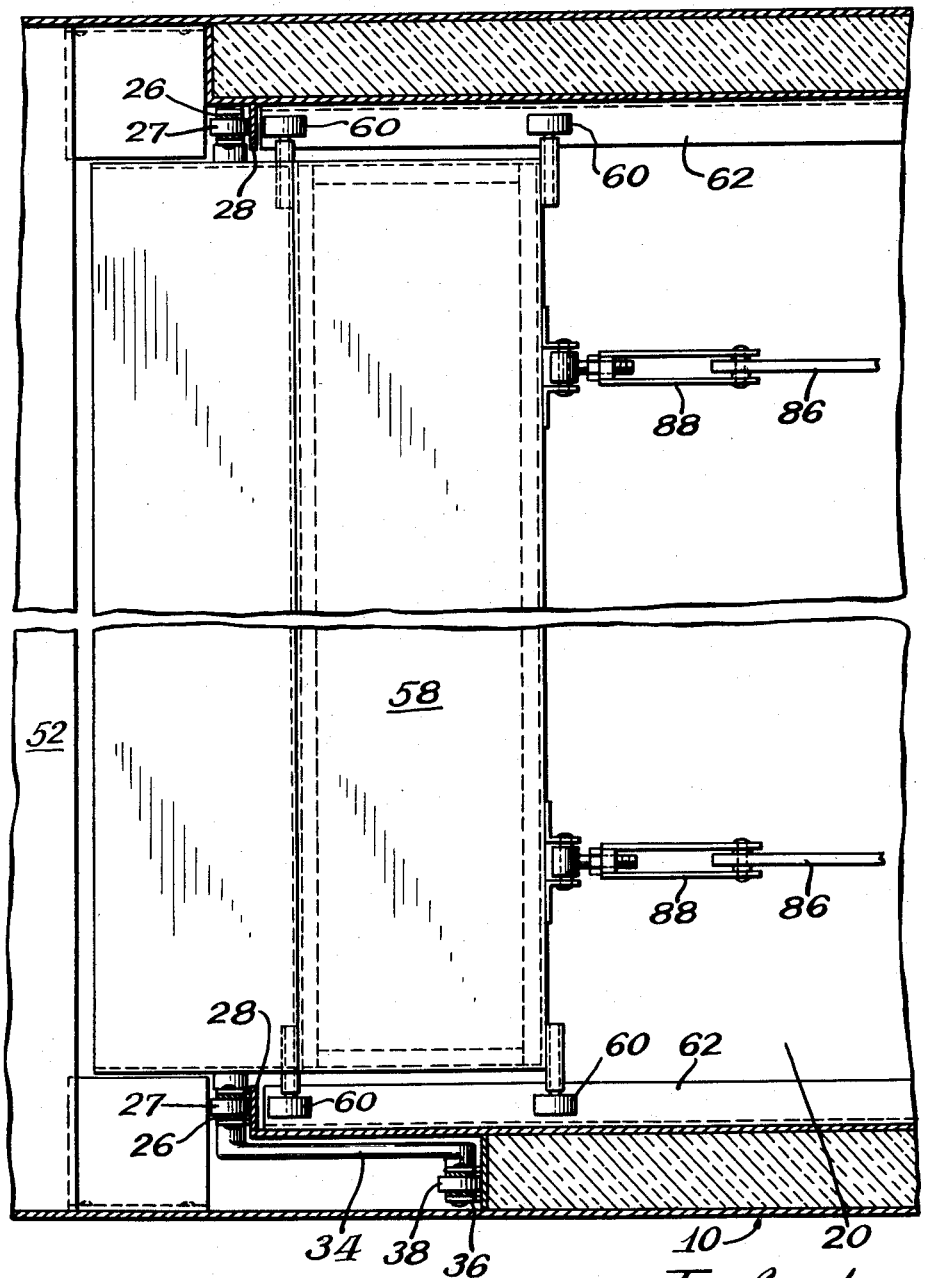
Figure 4 is a transverse, horizontal sectional view, taken substantially as indicated at line 4—4 on Figure 2.

For baking certain types of bread, such as hearth bread, if desired the door 58 may be maintained at its full open position by merely withdrawing the shear pin 82 so that, as a result of rearward movement of the segment member 74, through its abutment shoulder 84, engaging the cross pin 80, associated with the rocker arm 78, the rock shaft 76 is moved to its rearwardmost position, where it is permitted to remain, and during such movement simultaneously carrying therewith the linkage 86 and 88, to effect withdrawing the door 58 to full open position, as seen in Figure 3 of the drawings.

In baking ovens of the type wherein the conveyor is intermittently operated, causing the trays of the conveyor to be successively arrested with their loading surfaces thereof flush with the loading shelf 18, at the loading opening of the oven, the conveyor is usually arrested for a substantial interval of time, during which, by virtue of the present invention, the opening 56 is the partition means 50, is sealed off, thereby conserving heat and steam, and effecting economy of operation, and insuring obtaining desired baking conditions in the oven.

Extending transversely of the baking chamber, below the partition means 50, is a baffle wall 90, extending rearwardly and downwardly, from adjacent the rear edge of the partition opening 56. The baffle is secured to a brace member 92, extending transversely of the baking chamber and secured to the walls thereof. The purpose of this baffle is to reduce the possibility of cold air flowing through the loading opening 14 from rushing downwardly along the bottom of the baking chamber, and thus interfering with the desired heat condition within the lower portion of the baking chamber.

Although I have herein shown and described a preferred embodiment of the present invention, manifestly it will be capable of modification and re-arrangement of parts without departing from the spirit and scope thereof. I do not, therefore, wish to be understood as limiting this invention to the precise embodiment herein disclosed, except as I may be so limited by the appended claims.

I claim:

1. In combination with a baking oven having a heated baking chamber, the front wall of the oven having a loading opening for passing food stuffs into the baking chamber, and a loading shelf at the lower edge of said loading opening, a door for said loading opening, and power driven conveyor means in the baking chamber comprising upper and lower runs of conveyor chain, disposed in generally horizontal planes, with one end of the conveyor disposed in close proximity to the loading opening, and a plurality of uniformly spaced apart trays carried by said chains; a partition wall positioned above the loading shelf and extending transversely and to the side walls of the baking chamber, between the upper and lower runs of the conveyor and formed to define a tray opening at the front end of the baking chamber to permit passage of the conveyor trays therethrough, and means mounted entirely within the baking chamber and actuated in timed relation to the conveyor for alternately closing and exposing said tray opening in the partition wall in relation to the movement of the trays therethrough.

2. In combination with a baking oven having a heated baking chamber, the front wall of the oven having a loading opening for passing food stuffs into the baking chamber, and a loading shelf at the lower edge of said loading opening, a door for said loading opening, and power driven conveyor means in the baking chamber comprising upper and lower runs of conveyor chain, disposed in generally horizontal planes, with one end of the conveyor disposed in close proximity to the loading opening, and a plurality of uniformly spaced apart trays carried by said chains; a partition wall positioned above the loading shelf and extending transversely and to the side walls of the baking chamber, between the upper and lower runs of the conveyor and formed to define a tray opening at the front end of the baking chamber to permit passage of the conveyor trays therethrough, a door mounted entirely within the baking chamber for movement in a generally horizontal direction for controlling the tray opening in said partition wall, and means driven in timed relation to the movement of said trays for moving the door for the tray opening to and from closed position in relation to the movement of trays with respect to said tray opening.

3. In combination with a baking oven having a heated baking chamber, the front wall of the oven having a loading opening for passing food stuffs into the baking chamber, and a loading shelf at the lower edge of said loading opening, a door for said loading opening, and power driven conveyor means in the baking chamber comprising upper and lower runs of conveyor chain, disposed in generally horizontal planes, with one end of the conveyor disposed in close proximity to the loading opening, and a plurality of uniformly spaced apart trays carried by said chains; a partition wall located above said loading shelf and extending transversely to the side walls of the baking chamber, between the upper and lower runs of the conveyor and formed to define a tray opening at the front end of the baking chamber to permit passage of the conveyor trays therethrough, and means mounted entirely within the baking chamber and actuated in timed relation to the conveyor for alternately closing and exposing said tray opening in the partition wall in relation to the movement of the trays therethrough.

4. In combination with a baking oven having a heated baking chamber, the front wall of the oven having a loading opening for passing food stuffs into the baking chamber, and a loading shelf at the lower edge of said loading opening, a door for said loading opening, and power driven conveyor means in the baking chamber comprising upper and lower runs of conveyor chain, disposed in generally horizontal planes, with one end of the conveyor disposed in close proximity to the loading opening, and a plurality of uniformly spaced apart trays carried by said chains; a partition wall positioned above the loading shelf and extending transversely and to the side walls of the baking chamber, between the upper and lower runs of the conveyor and formed to define a tray opening at the front end of the baking chamber to permit passage of the conveyor trays therethrough, a door mounted entirely within the baking chamber for movement in a generally horizontal direction for controlling the tray opening in said partition wall, and means driven in timed relation to the movement of said trays for moving the door for the tray opening to and from closed position in relation to the movement of trays with respect to said tray opening, said door moving means being so correlated to the movement of the trays as to maintain the door for the tray opening in closed position when a tray is in registration with said loading shelf.

5. In combination with a baking oven having a heated baking chamber, the front wall of the oven having a loading opening for passing food stuffs into the baking chamber, and a loading shelf at the lower edge of said loading opening, and power driven conveyor means in the baking chamber comprising upper and lower runs of conveyor chain, disposed in generally horizontal planes, with one end of the conveyor disposed in close proximity to the loading opening, and a plurality of uniformly spaced apart trays carried by said chains; a partition wall extending transversely of the baking chamber, between the upper and lower runs of the conveyor and formed to to define a tray opening at the front end of the baking chamber to permit passage of the conveyor trays therethrough, a door for controlling the tray opening in said partition wall, and means driven in timed relation to the movement of said trays for moving said door to and from closed position in relation to the movement of trays with respect to said tray opening, said door moving means including power transmitting members, and a shear pin interconnecting said members, said members having portions, adapted to be engaged upon rupture of the shear pin, for moving the door for the tray opening to an open position.

6. In combination with a baking oven having a heated baking chamber, the front wall of the oven having a loading opening for passing food stuffs into the baking chamber, and a loading shelf at the lower edge of said loading opening, and power driven conveyor means in the baking chamber comprising upper and lower runs of conveyor chain, disposed in generally horizontal planes, with one end of the conveyor disposed in close proximity to the loading opening and extending upwardly from the lower run to the upper run, and a plurality of uniformly spaced apart trays carried by said chains; a partition wall extending transversely of the baking chamber, between the upper and lower runs of the conveyor and formed to define a tray opening at the front end of the baking chamber to permit passage of the conveyor trays therethrough, means actuated in timed relation to the conveyor for alternately closing and exposing said tray opening in relation to the movement of the trays therethrough, and a downwardly and forwardly inclined baffle extending transversely of the baking chamber and positioned rearwardly of the path of travel of the trays in their movement, at the front end of the baking chamber, from the lower run to the upper run of the conveyor.

7. In combination with a baking oven having a heated baking chamber, the front wall of the oven having a loading opening for passing food stuffs into the baking chamber, and a loading shelf at the lower edge of said loading opening, and power driven conveyor means in the baking chamber comprising upper and lower runs of conveyor chain, disposed in generally horizontal planes, with one end of the conveyor disposed in close proximity to the loading opening, and a plurality of uniformly spaced apart trays carried by said chains; a partition wall positioned above the loading shelf and extending transversely and to the side walls of the baking chamber, between the upper and lower runs of the conveyor and formed to define a tray opening at the front end of the baking chamber to permit passage of the conveyor trays therethrough, a door for controlling the tray opening in said partition wall, and means driven in timed relation to the movement of said trays for moving said door to and from closed position in relation to the movement of trays with respect to said tray opening, said door moving means comprising a power take off shaft, a sprocket on said shaft and meshing with the conveyor chain, a crank member on said shaft, a rock shaft, a segment member mounted on and connected to the rock shaft, a pitman interconnecting the crank member and segment member, and linkage interconnecting said rock shaft and the door for the tray opening.

8. In combination with a baking oven having a heated baking chamber, the front wall of the oven having a loading opening for passing food stuffs into the baking chamber, and a loading shelf at the lower edge of said loading opening, and power driven conveyor means in the baking chamber comprising upper and lower runs of conveyor chain, disposed in generally horizontal planes, with one end of the conveyor disposed in close proximity to the loading opening, and a plurality of uniformly spaced apart trays carried by said chains; a partition wall extending transversely of the baking chamber, between the upper and lower runs of the conveyor and formed to define a tray opening at the front end of the baking chamber to permit passage of the conveyor trays therethrough, a door for controlling the tray opening in said partition wall, and means driven in timed relation to the movement of said trays for moving said door to and from closed position in relation to the movement of trays with respect to said tray opening, said door moving means comprising a power take off shaft, a sprocket on said shaft and meshing with the conveyor chain, a crank member on said shaft, a rock shaft, a segment member loosely mounted on the rock shaft, a rocker arm fixed on the rock shaft, a shear pin interconnecting the segment member and rocker arm, and linkage interconnecting said rock shaft and the door for the tray opening.

9. In combination with the baking oven having a heated baking chamber, the front wall of the oven having a loading opening for passing food stuffs into the baking chamber, and a loading shelf at the lower edge of said loading opening, and power driven conveyor means in the baking chamber comprising upper and lower runs of conveyor chain, disposed in generally horizontal planes, with one end of the conveyor disposed in close proximity to the loading opening, and a plurality of uniformly spaced apart trays carried by said chains; a partition wall extending transversely of the baking chamber, between the upper and lower runs of the conveyor and formed to define a tray opening at the front end of the baking chamber to permit passage of the conveyor trays therethrough, a door for controlling the tray opening in said partition wall, and means driven in timed relation to the movement of said trays for moving said door to and from closed position in relation to the movement of trays with respect to said tray opening, said door moving means comprising a power take off shaft, a sprocket on said shaft and meshing with the conveyor chain, a crank member on said shaft, a rock shaft, a segment member loosely mounted on the rock shaft, a rocker arm fixed on the rock shaft, a shear pin interconnecting the segment member and rocker arm, and linkage interconnecting said rock shaft and said door, said segment member having a solid face extending arcuately at least 15 degrees beyond each side of and in arcuate alignment with the shear pin.

10. In combination with a baking oven having a heated baking chamber, the front wall of the oven having a loading opening for passing food stuffs into the baking chamber, and a loading shelf at the lower edge of said loading opening, and power driven conveyor means in the baking chamber comprising upper and lower runs of conveyor chain, disposed in generally horizontal planes, with one end of the conveyor disposed in close proximity to the loading opening, and a plurality of uniformly spaced apart trays carried by said chains; a partition wall extending transversely of the baking chamber, between the upper and lower runs of the conveyor and formed to define a tray opening at the front end of the baking chamber to permit passage of the conveyor trays therethrough, a door for controlling the tray opening in said partition wall, and means driven in timed relation to the movement of said trays for moving said door to and from closed position in relation to the movement of trays with respect to said tray opening, said door moving means comprising a power take off shaft, a sprocket on said shaft and meshing with the conveyor chain, a crank member on said shaft, a rock shaft, a segment member loosely mounted on the rock shaft, a rocker arm fixed on the rock shaft, a shear pin interconnecting the segment member and rocker arm, linkage interconnecting said rock shaft and said door, and portions on said segment member and rocker arm engageable, upon rupture of the shear pin, in one direction of movement of the segment member, for moving the door for the tray opening to an open position.

11. In combination with a baking oven having a heated baking chamber, the front wall of the oven having a loading opening for passing food stuffs into the baking chamber, and a loading shelf at the lower edge of said loading opening, a door for said loading opening, and power driven conveyor means in the baking chamber comprising upper and lower runs of conveyor chain, disposed in generally horizontal planes, with one end of the conveyor disposed in close proximity to the loading opening, and a plurality of uniformly spaced apart trays carried by said chains; a partition wall positioned above the loading shelf and extending transversely and to the side walls of the baking chamber, between the upper and lower runs of the conveyor and formed to define a tray opening at the front end of the baking chamber to permit passage of the conveyor trays therethrough, a door mounted entirely within the baking chamber for movement in a generally horizontal direction for controlling the tray opening in said partition wall, rollers carried at a pair of opposite edges of the door for the tray opening, track means mounted in the baking chamber and providing guided support for said rollers, and means driven in timed relation to the movement of said trays for moving the door for the tray opening to and from closed position in relation to the movement of trays with respect to said tray opening.

References Cited in the file of this patent

UNITED STATES PATENTS

| | | |
|---|---|---|
| 800,278 | Elpass | Sept. 26, 1905 |
| 1,141,601 | Baker | June 1, 1915 |
| 1,942,974 | Pointon et al. | Jan. 9, 1934 |
| 2,055,454 | Lee | Sept. 22, 1936 |

FOREIGN PATENTS

| | | |
|---|---|---|
| 343,782 | Germany | Nov. 8, 1921 |
| 451,580 | Germany | Oct. 29, 1927 |